United States Patent [19]
Ewert

[11] Patent Number: 6,142,913
[45] Date of Patent: Nov. 7, 2000

[54] DYNAMIC REAL TIME EXERCISE VIDEO APPARATUS AND METHOD

[76] Inventor: Bruce Ewert, 9501 S. 3200 East, No. 6, Sandy, Utah 84092

[21] Appl. No.: 09/433,088

[22] Filed: Nov. 3, 1999

Related U.S. Application Data

[60] Provisional application No. 60/005,239, Oct. 11, 1995.

[51] Int. Cl.$^7$ .................................. A63B 21/005
[52] U.S. Cl. .................. 482/8; 482/5; 482/902; 434/247
[58] Field of Search ............ 482/1, 4–8, 51–54, 482/57, 58, 63, 71–74, 901–903; 434/247

[56] References Cited

U.S. PATENT DOCUMENTS

| | | |
|---|---|---|
| 4,512,566 | 4/1985 | Bicocchi . |
| 4,512,567 | 4/1985 | Phillips . |
| 4,674,741 | 6/1987 | Pasierb, Jr. et al. . |
| 4,709,917 | 12/1987 | Yang . |
| 4,711,447 | 12/1987 | Mansfield . |
| 4,735,410 | 4/1988 | Nobuta . |
| 4,938,474 | 7/1990 | Sweeney et al. . |
| 4,949,993 | 8/1990 | Stark et al. . |
| 5,089,960 | 2/1992 | Sweeney, Jr. . |
| 5,207,621 | 5/1993 | Koch et al. . |
| 5,240,417 | 8/1993 | Smithson et al. . |
| 5,246,411 | 9/1993 | Rackman et al. . |
| 5,277,678 | 1/1994 | Friedebach et al. . |
| 5,308,296 | 5/1994 | Eckstein . |
| 5,362,069 | 11/1994 | Hall-Tipping . |
| 5,385,519 | 1/1995 | Hsu et al. . |
| 5,403,252 | 4/1995 | Leon et al. . |
| 5,462,503 | 10/1995 | Benjamin et al. . |
| 5,466,200 | 11/1995 | Ulrich et al. . |
| 5,489,249 | 2/1996 | Brewer et al. . |
| 5,507,708 | 4/1996 | Ma . |
| 5,524,637 | 6/1996 | Erickson . |
| 5,577,981 | 11/1996 | Jarvik . |
| 5,591,104 | 1/1997 | Andrus et al. . |
| 5,645,513 | 7/1997 | Haydocy et al. . |

*Primary Examiner*—Glenn E. Richmon
*Attorney, Agent, or Firm*—John R. Wahl; Merchant & Gould P.C.

[57] ABSTRACT

A system, apparatus and method for interactively controlling the rate of real-time video playback and audio track playback is disclosed. A preferred embodiment of the apparatus is an interactive exercise video system which utilizes a bicycle, a bicycle wheel speed detector, an interface unit connected to the wheel speed detector and to a conventional game controller connected to a conventional video game CD player, which is in turn connected to a TV. A prerecorded video CD is played in the player in which the display rate of video images is altered via software embedded on the CD such that the speed of the video is changed by the level of activity on the exercise device. The variation of the video frame rate is accomplished by modifying the duration time stamp on each video frame which is used by the player control program so as to change the sequential time at which each frame is called for display by the conventional video player. The variation of video display rate is independent of the pitch of the audio play rate. To maintain synchronization of the audio with the video without changing the pitch of the audio, portions of the audio are looped back, i.e. replayed.

10 Claims, 8 Drawing Sheets

DYNAMIC REAL TIME EXERCISE VIDEO APPARATUS AND METHOD

This application claims the benefit of U.S. Provisional Patent Application Serial No. 60/005,239, filed Oct. 11, 1995.

BACKGROUND OF THE INVENTION

1. Field of the Invention

This invention generally relates to exercise machines and exercise monitoring devices and more particularly to an interactive video coupled exercise apparatus.

2. Description of the Related Art

Moderate exercise, at an appropriate heart rate, is widely regarded today as an excellent way to improve one's health when performed on a regular and frequent basis. Many people prefer individual activities such as cycling, running, rowing, or skiing. These activities are usually performed during good weather conditions. During foul weather conditions, in order to maintain a regular exercise program, many people use stationary exercise devices such as stationary bikes or bike stands, treadmills, ski machines and stair steppers. Some representative exercise machines are disclosed in U.S. Pat. Nos. 4,938,474; 4,949,993; 5,089,960; 5,207,621; and 5,403,252.

One of the drawbacks of using stationary exercise equipment is that the scenery, typically a wall or window, viewed during the exercise period doesn't change. This type of exercising is boring. Typically, the user can counter boredom by watching TV, playing a video game, or simply letting his/her mind wander. However, these methods don't provide much real incentive for user participation and an enhanced exercise experience.

One solution is to make a video game interactive with the exercise device and the aerobic level of the user. A number of approaches to this end have been proposed. U.S. Pat. No. 4,711,447 to suggests utilizing an exercise machine to move simulated weapons on a video screen in relation to targets on a video screen into position so that the targets may be shot. U.S. Pat. No. 4,674,741 to Pasierb, Jr. et al discloses a rowing machine with a video display that relates the distance between a pacer figure and a rowing figure to the user's stroke motion.

U.S. Pat. No. 5,362,069 to Hall-Tipping discloses an apparatus which couples an exercise device to a video game in which the heart rate of the user (aerobic level) and the exercise device output level (bicycle pedal rate) are coupled to a standard video game in addition to the normal game hand controls. The video game difficulty and game piece movement level as well as the pedal resistance are changed in response to the heart rate signal in order to keep the user exercising at the desired or programmed rate.

U.S. Pat. No. 5,385,519 to Hsu et al discloses a computer controlled running machine which tilts and changes endless belt speed in synchronization with a computer CD programmed with various road conditions and sounds. The CD provides visual images and sounds of the road to the user via a head mounted visual-acoustic mask. There is no mechanism to vary the visual or audio effects due to the activity of the user.

U.S. Pat. No. 5,246,411 to Rackman et al discloses an exercise bike coupled through a speed sensor and a noise generator to a TV to introduce noise into the TV channel if the user exercises below a preset level or above another preset level.

U.S. Pat. No. 5,240,417 to Smithson et al discloses an arcade type bicycle racing simulation device which visually portrays, in an animated video scene, a rider's movements on an exercise bike in response to a variable terrain in the computer generated animated video. Sensors on the bicycle sense pedal speed and leaning position and feed this information to a computer which uses computer animation to change the position of an animated figure in the video scene of the track.

U.S. Pat. No. 5,277,678 to Friedebach et al discloses a skiing simulation device that is coupled to a video display which shows images of the terrain that the skier is moving over. The video system such as a video tape may send control signals to servo-motors to increase or decrease resistance to the movement of the skates depending on the viewed terrain on the tape. U.S. patent No. 5,489,249 to Brewer et al discloses another exercise machine control system coupled to a videotape player via the player's audio and/or video track to control the exercise machine resistance. However, there is no interaction with or control of the video in response to the user's efforts in these patents.

U.S. Pat. No. 5,308,296 discloses an interactive exercise device that utilizes interactive compact disc driven adventure scenarios and the user's physical responses to generate different outcomes to the computer generated scenarios presented on the video monitor. Speed and timing of exercise actions are required in order to advance through the scenario program.

Another simulated environment is displayed on a video display coupled to an exercise apparatus in U.S. Pat. Nos. 5,462,503 to Benjamin et al and U.S. Pat. No. 5,466,200 to Ulrich et al. These patents disclose a networked computer generated environment through which one or more users navigate on an exercise device such as a recumbent exercise bicycle with pedals and a steering control. The computer controls the resistance against pedaling and generates display of the relative positions of the networked users in the computer generated environment.

Each of these prior art references, that utilizes video scenes to enhance the exercise experience, relies on computer generated video scenes in order to simulate the visual progress of the user passing through the displayed visual environment. Although some video systems coupled to exercise devices utilize real-time video such as videotapes of wild scenic country or races, etc., none of these systems interactively control the speed of the user passing through the viewed "windows" or scenery.

SUMMARY OF THE INVENTION

It is therefore an object of the present invention to provide an interactive exercise monitoring apparatus in which the speed of the exercise device controls the speed of a real-time video frame sequence displayed on a video monitor such as a TV by a prerecorded video player device so that the user experiences the sensation of actually moving through the video environment in proportion to his/her exercise rate.

It is another object of the invention to provide an apparatus for converting a conventional exercise apparatus and a conventional video player coupled to a television into an interactive real time exercise monitoring video system.

It is another object of the invention to provide a prerecorded video disc for use with an apparatus for converting a prerecorded video CD player coupled to a television or video monitor into an interactive real time exercise monitoring video system.

It is another object of the invention to provide a method for independently varying the frame rate of real-time video playback frame sequences.

It is another object of the invention to provide a method of independently varying the frame display rate of real-time video sequences in conventional video playback machines in response to a user's rate of exercise independently of the audio playback rate.

It is another object of the invention to dynamically control the frame rate of real-time video playback in response to a user's exercise repetition rate without changing the pitch of an audio stream associated with the video frame sequence.

It is a still further object of the invention to maintain the flow of the sound from a sound track associated with a real time video sequence independent of the video frame display rate.

The apparatus in accordance with one preferred embodiment of the invention is designed for use with a bicycle mounted on a conventional stationary exercise stand in which the rear wheel is laterally supported such that the wheel engages a resistance roller. The bicycle is outfitted with a handlebar mounted cycle computer. For example, a conventional heart rate and cycle speed computer system such as the Vetta VHR25 may be used.

The Vetta VHR5 cyclocomputer is removably fastened to a mount secured to the handlebar of the bicycle. The rear wheel of the bicycle is fitted with a magnetic reed switch pickup for the handlebar mounted cyclocomputer and the user wears a heart rate transmitter strap band around his/her chest in this commercially available cyclocomputer system. The receiver is enclosed within the cyclocomputer.

The apparatus in accordance with the present invention basically comprises the VHR25 wheel pickup, an interface unit mounted on the cyclocomputer handlebar mount in place of the cyclocomputer, a conventional video game controller connected to the interface unit and connected to a video game CD player, a video monitor or a conventional television receiver connected to the video game player, and a prerecorded video CD playable in the video game player. The interface unit converts the cyclocomputer input signals into outputs that can be used in the video game player. The game controller is preferably removably mounted to the bicycle handlebar via the interface unit so as to be readily accessible to the bicycle rider during exercise.

The prerecorded video CD preferably contains a software program which modifies the conventional video player control program. The software program on the CD modifies this video player control program based on the signal from the interface unit or signal converter mounted on the bicycle handlebar. The software program effectively delays or speeds up the effective frame sequence transmission rate from the player to the video monitor or TV in response to the signal from the interface unit, which is proportional to the speed of the bicycle, i.e. the rate of exercise.

In real time video recording, as opposed to computer generated animated video production, each real time video frame receives a unique time stamp and duration stamp during videotape recording. These time and duration stamps are also recorded on the CD during the recording of the video on the CD. The video control program in the video CD player then uses the unique time stamp and duration stamp associated with each video frame recorded on the CD to transmit the sequence of video frames at the proper time and in proper sequence to the video monitor or television.

The system and apparatus in accordance with the present invention utilizes a signal proportional to a user's exercise rate (speed) to dynamically generate modification values to modify the duration stamp values actually utilized by the player in order to effectively speed up or slow down the frame sequence rate in proportion to the user's exercise rate. The result, when viewed by the user is the visual perception of actually traveling through the scenery depicted in the video sequence.

The exercise level signal in the illustrated embodiment is generated from input from the wheel reed switch mentioned above. A wheel magnet is fastened to one of the wheel spokes. A reed switch is fastened to one of the rear forks at a position opposite the wheel magnet switch. Each revolution of the bicycle wheel causes the reed switch to momentarily close as the magnet passes by. This closure is sensed by the interface unit circuitry which counts the time between reed switch closures, which is therefore proportional to the speed of the bicycle. This signal or count is fed through the conventional video game controller pad through the tandem video controller port and then to the video player where it is used as the basis to modify the duration time stamp of each video frame in accordance with the software program.

Functionally, the software program basically converts this speed signal to a modification value which is added to the unique duration time stamp for each successive video frame. The modification value changes as the user's speed changes. Therefore, the software program queries the modification value register and functionally modifies the next frame's time stamp before sending each video frame to the monitor for display.

The method in accordance with the present invention of controlling a video frame sequencing rate in a video playback sequence in which each video frame has a unique frame time stamp comprises the following steps:

a) setting time offset to current clock time;

b) displaying a current video frame;

c) accessing a frame time stamp value and a duration time stamp value associated with said current video frame;

d) accessing a user variable external signal;

e) determining an adjustment value from predetermined criteria compared to the external signal;

f) adding the adjustment value, the duration time stamp value, and the time offset to the frame time stamp value to generate a next frame time value;

g) displaying a next frame when current clock time exceeds said the frame time value; and h) repeating steps a) through g) for each successive video frame in the sequence of video frames.

The step of displaying a frame more particularly includes the steps of i) comparing current clock time to the next frame time value;

ii) if the current clock time equals or exceeds the next frame time value, then decompressing a next video frame into a display buffer; and iii) adding the adjustment factor to the time offset, which maintains a running track of adjustments made to the duration stamps during execution of the video frame sequence.

The method of the present invention and the apparatus may be used with any exercise device which can provide a signal representative of the user's exercise rate. For example, the bicycle may be replaced by a cross country ski machine, a stationary running machine, a stair stepper, or a rowing machine. The storage medium such as a video CD used in the player in accordance with the present invention may have any number of video sequences recorded thereon, and it would be particularly desirable if the video sequence corresponded to the particular type of exercise device. For example, a road or trail passage sequence would be appropriate for a bicycle exercise device. A climbing sequence might be appropriate for a stair stepper. Both video sequences could be recorded on the storage medium so that either exercise device could be used.

The audio which is recorded on the CD along with the video frame sequence may be recorded as a separate track or in discrete audio data chunks associated and keyed to each video frame. The method of varying the video display rate in accordance with the invention does not affect the reproduction rate of the audio track. In the embodiment where the audio data chunks are interleaved with the video frames, the audio data chunk can be looped back over and over by the embedded program on the CD in order to maintain synchronization with the video frame being displayed, regardless of the rate of frame display. The result is a realistic interactive exercise monitoring apparatus which uses readily available components of existing video game player systems and readily available exercise equipment. The invention may also be advantageously utilized with virtual reality glasses where the display is replaced by eye level display units which could even be expanded to include stereographic display devices with interlaced scan lines mapping alternate eye viewpoints. With the proper display goggles, LCD lens devices, or other device, the user would perceive realistic three dimensional motion in real time, while actually exercising on a stationary exercise device.

These and other objects, features and advantages of the present invention will become more readily apparent from a reading of the following detailed description when taken in conjunction with the accompanying drawing and appended claims.

DETAILED DESCRIPTION OF THE INVENTION

Figure 1:
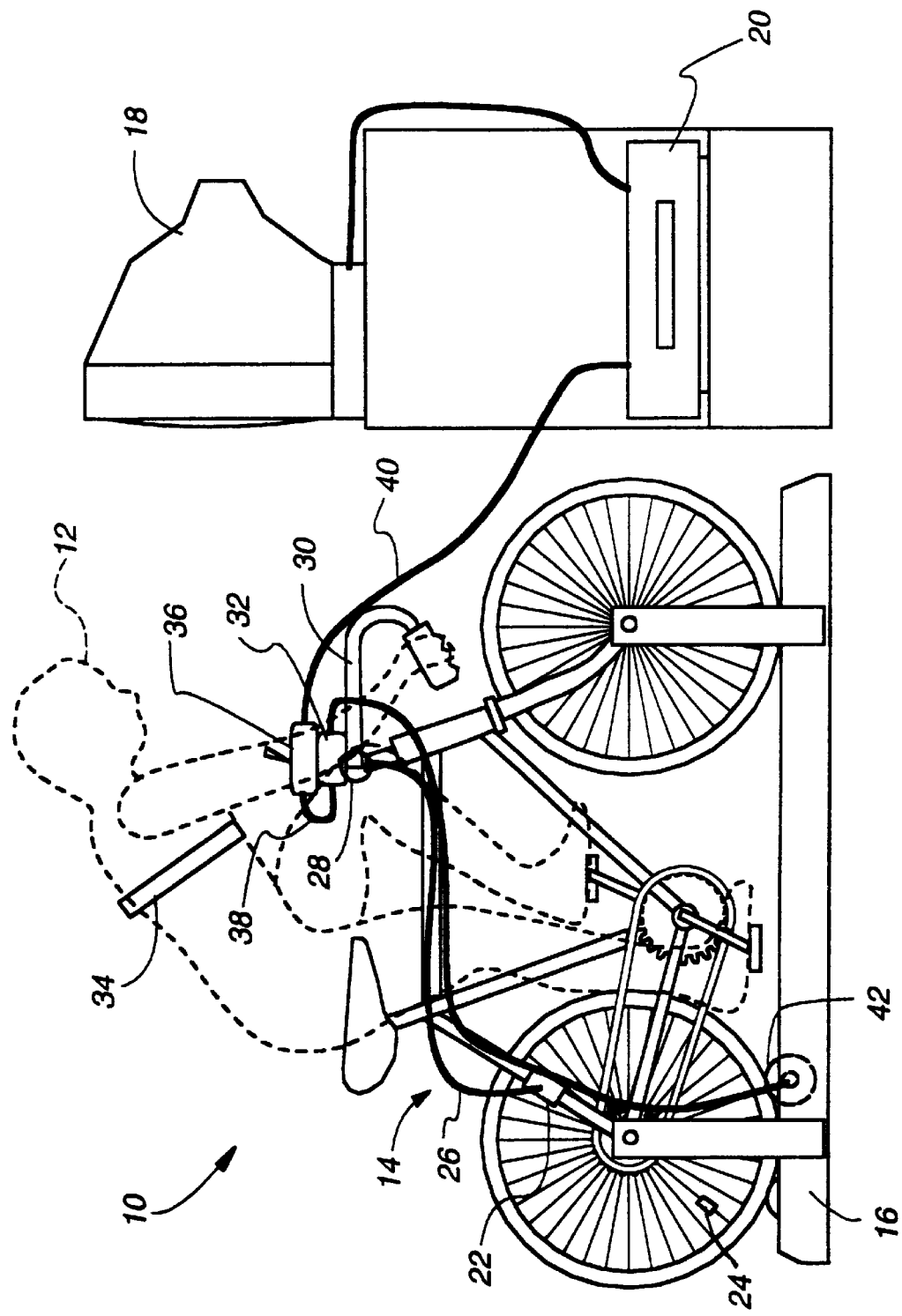
FIG. 1 is a schematic side view of one embodiment of the apparatus in accordance with the invention utilized on a bicycle.

Referring now to the drawing, a schematic side view of the apparatus in accordance with a first embodiment of the apparatus 10 in accordance with the invention is shown in FIG. 1. In FIG. 1, a user 12, shown in outline form, operates an exercise device 14 such as a bicycle which is mounted on a stationary exercise stand 16. Positioned in front of the bicycle stand 16 is a television receiver 18 connected to a game CD player 20.

The bicycle 12 is fitted with a cycle computer wheel pickup 22 which senses the passage of a wheel magnet 24.

The wheel pickup 22 is typically a reed switch which is connected to the cycle computer via leads 26. Leads 26 terminate at contacts (not shown) in a handlebar mount 28 fastened to the handlebar 30 of the bicycle 14. For use with the present invention, the cycle computer (not shown) is simply removed from the handlebar mount 28 and replaced with an interface unit 32 which clips into the handlebar mount 28. The interface unit 32 has contacts which mate with the contacts connected to the leads 26 from the wheel pickup 22 mounted on one of the rear fork arms of the bicycle 14.

Optionally, the interface unit includes a heart rate receiver circuit therein that receives a radio frequency signal from a heart rate sensor/transmitter band 34. The user 12 fastens the band 34 around his/her chest. A heart rate or pulse signal is sent normally from the band 34 to the user's receiver which may be a cycle computer such as a Vetta VHR-25 cyclocomputer. The cyclocomputer is usually mounted on the bicycle handlebar. The transmitter band is close enough (within about three feet) to the receiver in the cyclocomputer to receive the weak signals transmitted. The heart rate receiver circuit in the interface unit 32 is located in the same place and is functionally the same as in the conventional cyclocomputer except that it generates a signal which is in turn fed to the CPU in the player 20 rather than a signal that is displayed on the handlebar mounted cyclocomputer.

The game CD player 20 is also connected to a remote game joystick controller or keypad 36 which is removably fastened to the interface unit 32. The interface unit 32 is electrically connected to the standard accessory input port on the keypad 36 by a cable 38. The keypad is connected to the game CD player 20 by game cable 40. The game CD player 20 normally accepts several player keypads for additional users to play interactive games together by connecting one keypad to another keypad. The interface unit 32 utilizes this feature to connect the interface unit 32 into the player central processing unit or CPU.

The exercise device, in this example, a stationary bicycle exercise stand 16, includes a resistance means such as a variable friction resistance roller or wheel 42. This friction roller may be set by the user manually, or optionally may include a servomotor connected to the interface unit 32 via leads 46. In this latter instance, the user may control the resistance setting via the keypad 36 and/or the resistance may be controlled automatically through the player 20 by the program in accordance with another aspect of the invention as will be subsequently described.

In order to set up the apparatus 10 in accordance with this embodiment of the invention. the user places the bicycle 14 on the stationary stand 16, hooks up the game player, such as a Panasonic REAL 3DO Interactive Multiplayer CD game console, to a TV or audio/video monitor 18 and connects the game player 20 to its remote keypad 36. The user then removes the cyclocomputer from the handlebar mount 28 and replaces it with the interface unit 32, and connects the keypad 36 to this interface unit 32 via connector cable 38 and optionally connects the resistance wheel 42 to the interface unit 32. Finally the user inserts a prerecorded video disc (CD) into the player, turns it on, starts the CD playing, and starts to ride, while watching the TV display.

The prerecorded video CD contains a control program in accordance with the invention and a sequence of preferably real time video and audio frames recorded thereon such as a sequence from a single track trail ride in Moab, Utah, etc. originally made utilizing a helmet cam POV video camera. As the user pedals, he can visually see and hear the route along the single track. In addition, the control program in accordance with the invention modifies the video sequence rate in the player 20 CPU fed to the TV 18 commensurately with the speed that the user 12 is pedaling. This gives the user/viewer a realistic feeling that he is actually following the route of the displayed single track in real time. In addition, the video sequence freezes when the user stops the bicycle, as would the scenery viewed on an actual ride.

The program may also change the resistance wheel 42 setting commensurate with the terrain being traveled in the video. For example, the resistance may be increased when the video sequence involves uphill travel and decreased when the sequence shows downhill travel.

Figure 2:
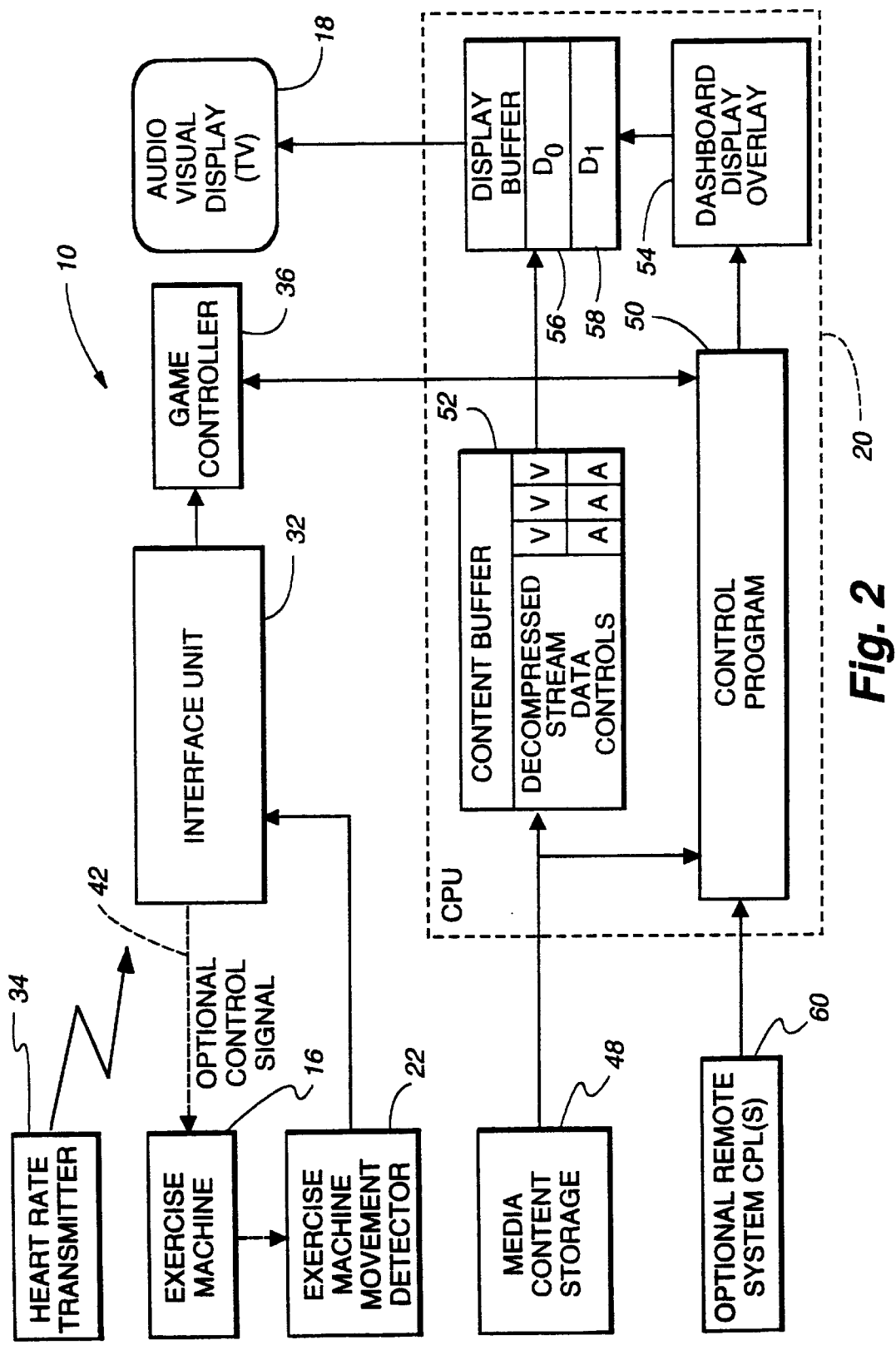
FIG. 2 is a block diagram of the apparatus in accordance with the invention shown in FIG. 1.

FIG. 2 is a block diagram of the apparatus in accordance with the invention shown in FIG. 1. The apparatus 10 includes the interface unit 32 connected to the game controller or keypad 36 which is in turn connects to the CPU of the player 20. A prerecorded data storage medium 48, such as a compact laser disc (CD) in accordance with the invention, is inserted into the player 20. This CD contains media data including a set of digitized video frames and audio data packets and an encoded program which modifies the player control program 50.

The CPU of the player 20 includes the control program 50, a content buffer 52 which decodes and decompresses the data stream read from the CD 48, a dashboard display overlay generator 54, and a set of at least two display buffers 56 and 58. The player 20 also optionally has inputs for signals from remote system CPUs 60.

The game player 20 includes a control program or operating system 50 which controls all basic input and display functions. Each CD typically played in the player 20 also includes a program which manipulates the control program 50 to produce the particular game scenery set and characters displayed and manipulated on the audio visual display 18.

However, in the present invention, instead of the game program on the CD, the CD contains an exercise program thread to manipulate and display the real time exercise inputs from the interface unit 32 such as speed, cadence, total distance traveled, lap distance, calories burned and time lapsed and time remaining in the particular exercise segment. These parameters are calculated and displayed on a "dashboard" overlay on the audio visual monitor 18. They are generated in the overlay block 54 and fed to the display buffers 56 and 58 as will be subsequently further discussed. The overall control of the video sequences, and the start/stop of the exercise overlay program is manipulated via the keypad 36 mounted on the interface unit 32 on the handlebar 30 of the bicycle 14.

Figure 3:
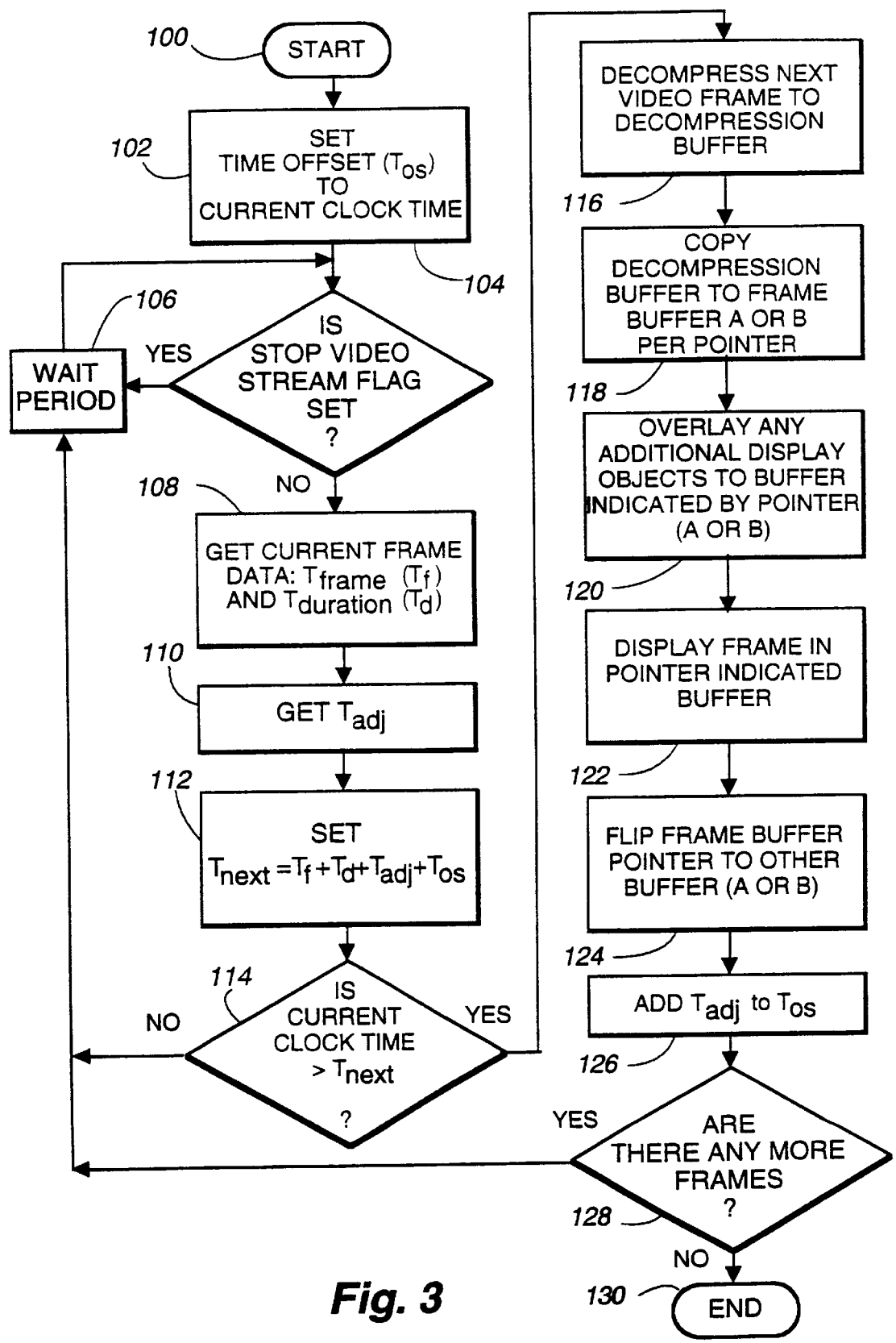
FIG. 3 is a flow diagram of the video frame rate control program encoded on the video disk in accordance with the present invention.

The play of the video and audio sequences stored on the CD in accordance with the present invention is controlled by the program shown in block diagram form in FIG. 3. This program is encoded on the CD and operates on the operating control program 50 in the CPU of the player 20.

The present invention preferably utilizes real time video and audio recorded sequences, such as can be recorded using a POV (Point of View) videotape camera mounted on an athlete's head or vehicle such as a bicycle. Each video frame recorded is assigned and has recorded with it a unique frame time stamp value and a duration stamp value for accessing the next frame packet of data upon playback. Typically, in real time recording, the duration stamp is a constant value, for example, about 8 milliseconds. These frame stamp and duration values are necessary components for the playback apparatus to properly sequence and time the reproduced display. The audio may be interlaced with the video or may be a separate track recording. The recorded sequence of video and audio are then digitized and recorded on a video CD along with the control program described below and shown in the Figures herein.

The basic effect of the control program of the present invention is to control the video frame reproduction rate in accordance with the exercise rate of the user on the exercise device 14. Therefore as the exercise rate increases, the frame rate of display increases, and the user sees the scenery flashing by faster. As the exercise rate decreases, the user sees the scenery pass by slower and slower, until the user stops and the scene displayed stops also. Thus the user gets the sensation of actually traveling through the scenery shown in the video.

The process flow begins, in FIG. 3, in operation 100 when the user inserts the exercise video CD in the player 20, begins to play the CD, and begins pedaling the bicycle. First, the program sets, in operation 102, a cumulative time offset ($T_{os}$) to the current clock time of the CPU. This time offset tracks the total difference in time that the program modifies the video sequence due to the exercise rate of the user.

The program next queries, in operation 104, whether a stop video stream flag is set. This flag will be discussed further below in reference to the program operations in FIG. 4. However, if the Stop Video Flag is set, as when the user stops pedaling to rest for a period of time, control passes to a wait operation 106. Wait operation 106 is typically a process delay of on the order of 10 milliseconds, after which the query in operation 104 is performed again. If the Stop Video Stream flag is not set, control passes to operation 108.

In operation 108, the current frame time stamp value ($T_f$) is retrieved and the current frame duration value ($T_d$) is retrieved from the decompressed stream data in content buffer 52. Then the Adjustment value ($T_{adj}$) is obtained, in operation 110, from the program sequence shown in FIG. 4. In operation 112, the variable $T_{next}$ is set equal to $T_f+T_d+T_{adj}+T_{os}$. This is the clock time at which the next frame should be decompressed into the decompression buffer 52.

In operation 114, the query is made whether current CPU clock time is equal to or greater than $T_{next}$. In other words, whether it is time to show the next video frame. If the answer is no, control passes again to the wait operation 106. If the answer is yes. control passes to operation 116 where the next video frame is decompressed to the decompression buffer in the control buffer block 52 of the player CPU. Control then passes to operation 118. In operation 118, the contents of the decompression buffer are copied to either frame buffer A or frame buffer B, whichever is pointed to by a pointer which alternates between the two frame buffers.

As soon as the decompression buffer is copied to the pointed to frame buffer in operation 118, control is passed to operation 120, where display objects such as the dashboard indicating the current heart rate, pulse icon and exercise status parameters, are overlaid into the buffer indicated by the pointer. Once the frame buffer contents are overlaid, control shifts to operation 122 and the contents of the frame buffer pointed to is sent to the video display or television set.

In operation 124, the frame buffer pointer is switched to the other buffer. In operation 126, the contents of $T_{adj}$ are added to the $T_{os}$ register so as to keep track of total adjustments to the sequence. Control then passes to operation 128 where the program queries whether there are any more video frames in the sequence on the CD. If there are none, the program ends in operation 130. If there are additional frames, control passes again to the wait operation 106 and the above steps are repeated.

Figure 4:
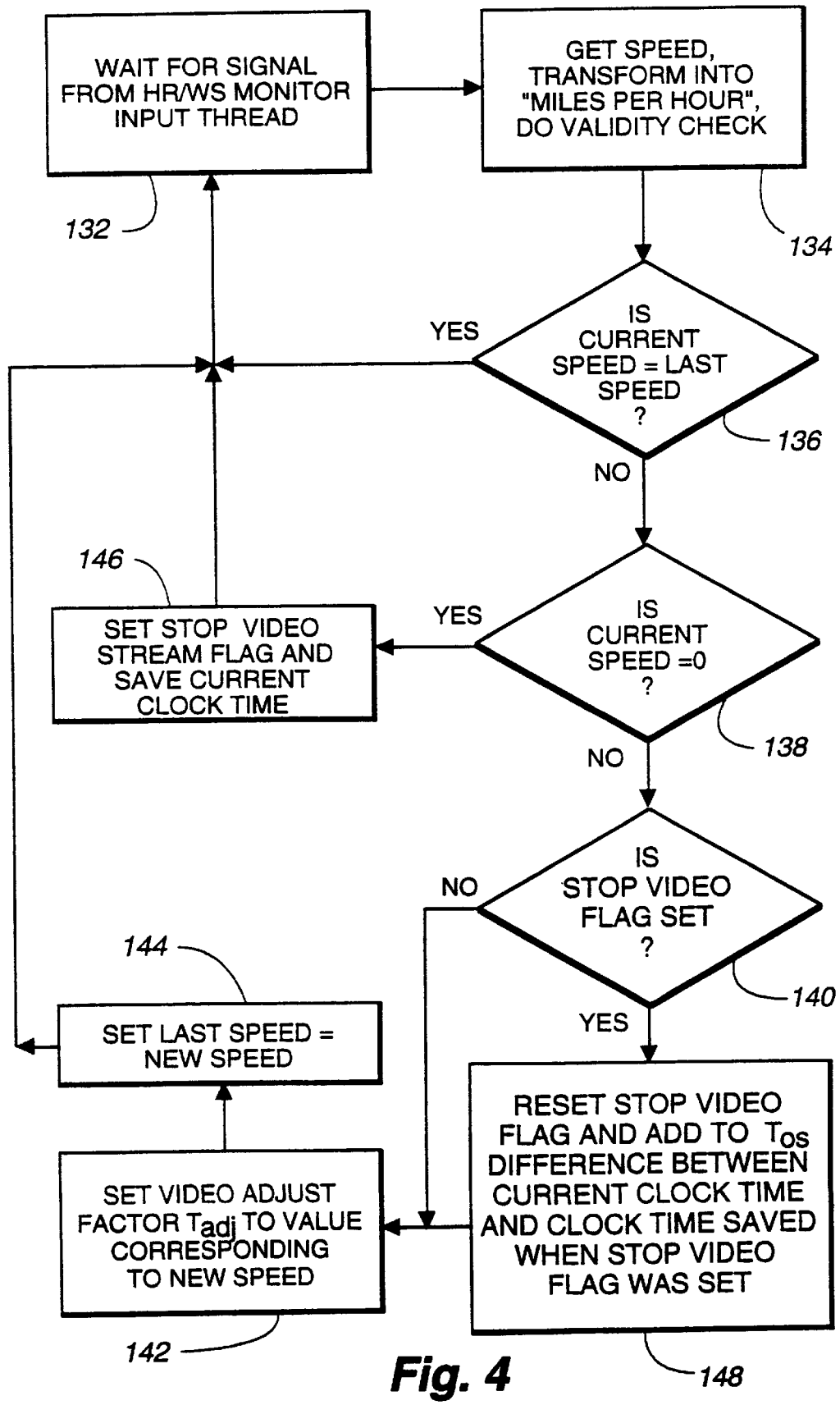
FIG. 4 is a flow diagram of the adjustment factor subroutine in accordance with the present invention.

As can be seen by the above explanation, the video reproduction rate is modified by adding time or subtracting time from the prerecorded frame duration stamp value. In other words, the value of $T_{adj}$ changes and thus modifies the effect of $T_d$. FIG. 4 describes how $T_{adj}$ is modified. The sequence of operations in FIG. 4 occur continuously so as to always have a value of $T_{adj}$ corresponding to the user's exercise rate.

The sequence begins in operation 132 where the wheel speed input signal from the wheel pickup is fed through the interface unit 32 into the CPU through the game controller keypad 36. The current speed, corresponding to miles per hour or kilometers per hour, is obtained from the raw signal in operation 134. This current speed is continually updated so long as there is a wheel speed thread from the interface unit 32. In addition, validity checks are performed in this operation to ensure that the signal is, in fact, a correct wheel speed signal.

Control then shifts to operation 136 where the query is made whether current speed equals the last speed. If so, control returns to operation 132 for another input from wheel speed. If not, the query is made in operation 138 whether current speed is equal to zero. If not, control transfers to operation 140 where the query is made whether the Stop Video Flag is set. If this flag is not set, then control passes to operation 142 where the video adjust factor, $T_{adj}$ is set to a table value corresponding to the current speed. An example of the table values is provided in Table 1 below. These values are empirically determined to give the appearance to the user of smooth transitions between frames and may be different for different operating systems and different video player machine speeds. Table 1 values are chosen for video operation on a Panasonic 3DO multiplayer system.

TABLE 1

| Miles per hour | $T_{adjust}$ |
|---|---|
| 2 | 112 |
| 4 | 96 |
| 6 | 80 |
| 8 | 72 |
| 10 | 64 |
| 12 | 48 |
| 14 | 36 |
| 16 | 28 |
| 18 | 20 |
| 20 | 12 |
| 22 | 8 |
| 24 | 4 |
| 26 | 2 |
| 28 | 0 |
| 30 | -2 |
| 32 | -4 |

Control then shifts to operation 144 where Last Speed is set equal to New Speed and control again transfer to operation 132 where another signal from the wheel sensor is awaited. If the Current Speed is equal to zero in operation 138, control transfer to operation 146 where the Stop Video Stream flag is set and current clock time is saved. The Stop Video Stream flag is needed back in operation 104 to cover the situation where the user stops to rest after beginning a sequence. The current clock time when this flag is set must be saved because, after the start, in operation 100, clock time is continuously running. Therefore, if the user stops momentarily, requiring the video sequence to freeze, the duration of the stopped period must be added to the time offset in order to keep the sequence operating properly based on current clock time.

When the user again starts pedaling, a signal will be produced in operation 132. Control then sequences through operations 134 and 136 with "no" answers. In operations 140, the answer is "yes" to the query whether the Stop Video Flag is set Control then transfer to operation 148 resets the Stop Video Flag and adds to $T_{os}$ the elapsed time between the current clock time at flag reset and the clock time saved when the Stop Video Stream flag was previously set. This addition to $T_{os}$ accounts for the lapse while the user was idle. Control then transfers again to operation 142 where the video adjust factor $T_{adj}$ is appropriately set as described above.

The sequence illustrated in FIG. 4 is continuous and proceeds whenever there is a signal from the wheel speed monitor input thread from the interface unit 32. Therefore this program sequence is constantly updating during the exercise activity. In contrast, the sequence illustrated in FIG. 3 operates only so long as there are video frames to be displayed. This is typically on the order of 20–30 minutes on today's game player systems.

Figure 5:
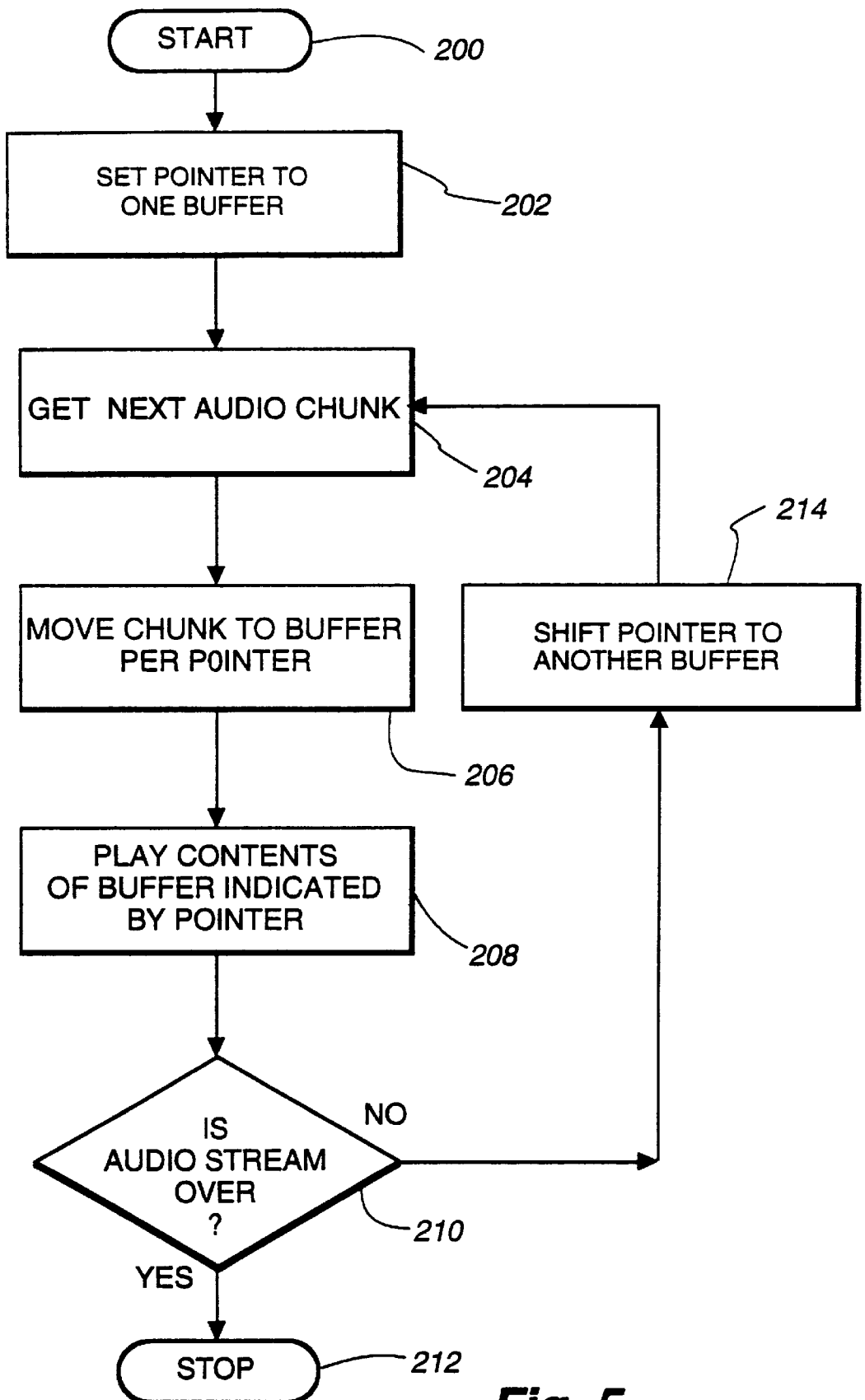
FIG. 5 is an audio streaming control program flow diagram for audio data chunks interleaved with video data chunks in accordance with the invention.
Figure 6:
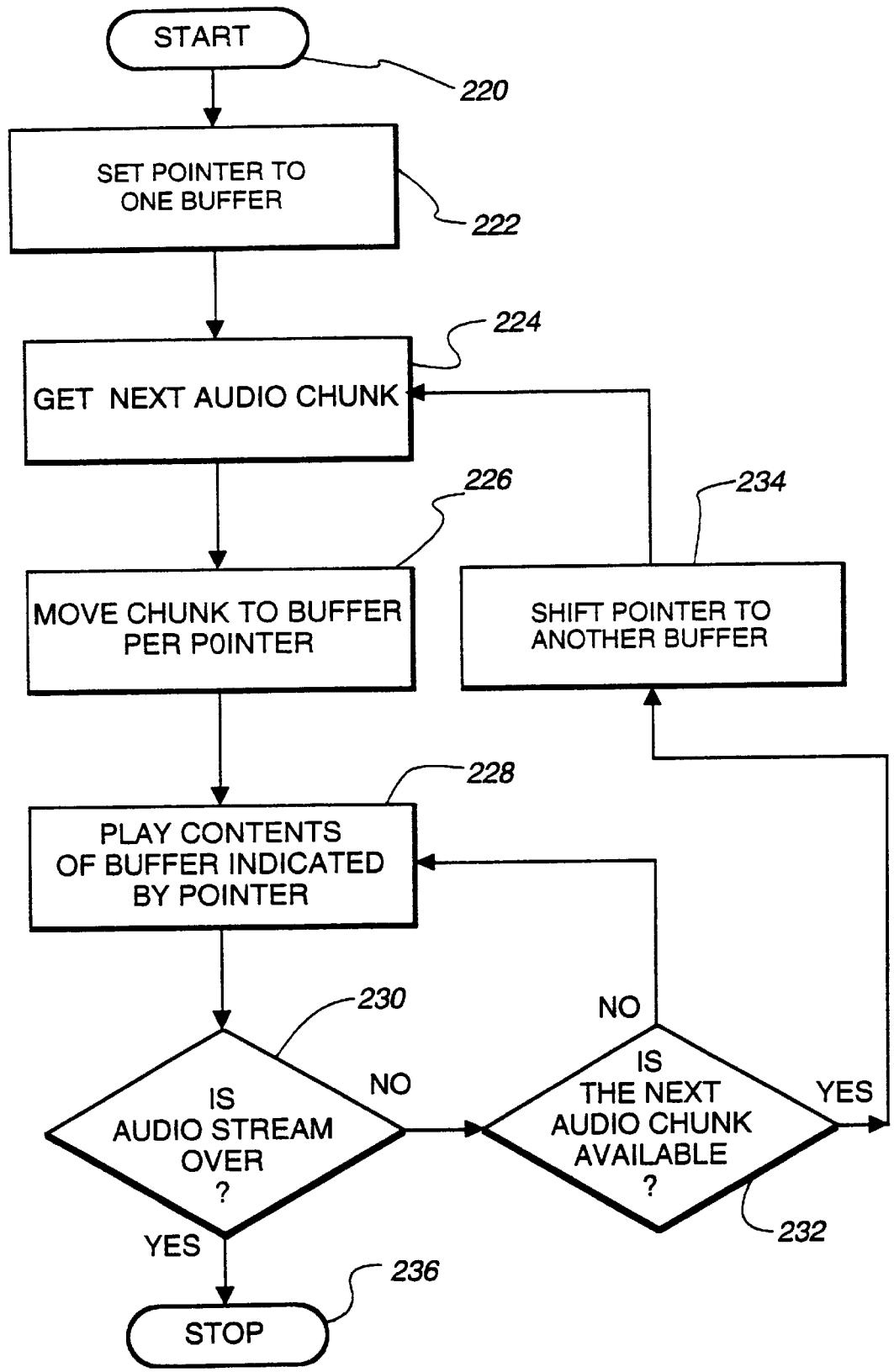
FIG. 6 is an audio streaming control program flow diagram for audio data chunks in a file separate from the video data file.

Turning now to FIGS. 5 and 6, flow diagrams for two versions of the audio portion of the prerecorded sequence are shown. There are basically two ways in which the audio data is encoded on the video compact disc. The audio data chunks may be in a separate file from the video file or the audio data chunks may be interleaved with the video frame data chunks in the same file. The FIG. 6 flow diagram is for processing audio data chunks which are stored in a separate audio data file on the CD. FIG. 5 provides a flow diagram for play of audio data chunks which are interleaved with the video frame data in the same file. Either case may be used dependent upon variables such as buffer space and storage medium drive speed. The audio program code is encoded on the CD as is the video program code described above with reference to FIGS. 3 and 4.

Referring now to FIG. 5, when the video stream starts, the audio stream starts in operation 200. A digital pointer is set to one of at least two audio buffers in operation 202 and control passes to operation 204 where an audio data chunk is retrieved from the decompression content buffer 52. The audio data chunk is then loaded into the buffer pointed to by the audio pointer in operation 206. As soon as the audio chunk is loaded into this buffer, contents of the buffer begin to play in operation 228. Meanwhile, operation control is passed to operation 210 where the query is made whether the audio stream is complete. If so, control passes to operation 212 and the audio play stream stops. If the audio stream is not complete, control passes to operation 214 where the pointer is shifted to the next buffer and control is passed back to operation 204. This process repeats until there are no more audio data chunks signifying that the audio stream is complete. In the case just described, the audio continues to play, even when the video slows in response to the actions of the user on the exercise device 14.

Referring now to the interleaved audio flow diagram in FIG. 6, when the first video frame is decompressed and loaded into the display buffer as described above with reference to FIGS. 3 and 4, the audio stream control begins in operation 220. First, a pointer is set to one of at least two audio buffers in operation 222. Control then passes to operation 224 where an audio data chunk associated with the current video frame is retrieved from the decompression content buffer 52. This data chunk is then loaded into the audio buffer pointed to in operation 226 and play of this audio chunk immediately begins in operation 228. At the same time, control shifts to operation 230 where the stream is queried to determine if the audio stream is complete. If not, the query is made, in operation 232, whether the next audio data chunk is available.

In other words, the query in operation 232 is whether the next video frame has been called for display. This becomes important when the user is slowing down the video display by reducing his or her exercise rate, e.g. pedaling slower. If the next video frame has not been called, the next audio data chunk will not be available. In this case, operation 232 transfers control back to operation 228 and the current audio data chunk is replayed. Where the audio is wind noise, sounds of the road, or natural background noise in the country, the user will not likely be able to distinguish that the audio is being "looped back". Once the next video frame is called, the query in operation 232 will transfer control to operation 234 where the pointer is set to another buffer. Control then transfers back to operation 224 to get another audio data chunk and operations 226, 228, 230, and 232 are repeated until the last of the audio stream is processed. In this case, control is transferred to operation 236 where the audio play is stopped.

If the user of the exercise device is maintaining a good speed, the need for two or more audio buffers becomes apparent. The audio buffers provide a smooth sequencing of audio chunk play. In the present invention, the rate of audio play remains constant, independent of the video frame display rate so that the audio pitch and tempo remains constant and the user perceives a pleasing audio signal, as he would on location. Also, as the user slows down, the on-location sounds would not change appreciably. However, optionally, the audio volume may be made to increase or decrease as the user increases or decreases speed respectively. Therefore looping these audio chunks of wind and road noise back during slow exercise periods as described in FIG. 6 maintains the perceptive effect of the audio being independent of the video rate of display, yet tying the audio content to the video frames being displayed. For example, in the case of a cross country trail bicycling video, the video scenes may show a very bumpy section followed by a smooth trail section. If the audio includes road noise rather than music etc., it would not be realistic to have a constant level of road noise. The audio stream during the bumpy section would naturally have an increased level of road noise. Therefore the method of audio control shown in FIG. 6 is preferred, since the audio chunks are keyed to the video frames. Keeping this road noise level up as the bumpy video frames are shown maintains the realistic perception of the journey. The loop back feature between operations 228, 230 and 232 is provided to maintain this consistency while adjusting the length of the audio stream.

The present invention is described above with reference to one particular embodiment thereof. However, the apparatus and method of the invention may be adapted to any video CD playing system. The particular embodiment above is specifically designed for use in a Panasonic REAL 3DO Interactive Multiplayer. This game player can play audio CDs, video CDs, and game CDs which use the 3DO operating system. Other operating systems and platforms may also be used, including multimedia computers which accept video CDs. In addition, the storage medium may be other than a video CD. The storage medium may be a computer hard disk or the video/audio file may be transmitted over cable, via modem, or other transmission means to the CPU of the playing device. Thus the playing device may be a multimedia PC, a dedicated video game player, or a multi-player such as the 3DO system or a set top box coupled via modem or cable to a television.

The primary difference between these various playing systems is that program coding would change depending on the operating system used. However, the program operations and steps described above remain the same and may be implemented on any of these platforms. Other variations and modifications to the apparatus may also be made without departing from the scope of the invention. For example, the exercise device may be a stationary ski machine, stair stepper, rowing machine or treadmill. The interface unit may be permanently built in to the control system for the exercise machine or may be separately installed. The media content storage may be a video CD, a file transmitted via broadcast or modem, or other digital data storage device such as computer memory or computer hard drive. The player CPU may be a commercial game player, a dedicated CPU made specifically for the purpose of the exercise machine, or it may be included with an interface unit integral to a set top box connected to a TV.

Another variation, shown in FIGS. 1 and 2, is the output connection of a control signal to the exercise device 14. The prerecorded video may include coded data for setting the exercise device to predetermined resistance values. In this case, the program would include a control thread which accesses the control data associated with the video frame which sets the resistance. This data would then be translated into setting values which would be transmitted to the servomotor or stepper motor connected to the resistance control such as resistance wheel 42 on the exercise stand 16 shown in FIG. 1.

The interface unit 32 includes a battery, a PIC programmable processor, a heart rate receiver tuned to the transmission frequency of the heart rate transmitter 34, a series of shift registers, a 10 MegaHertz clock, wheel speed input terminals which mate with the contacts on the cyclocomputer handlebar mount 28, and a nine pin output connector which connects the interface unit 32 to the 3DO game controller keypad 36. The PIC processor is an 8 bit device, which processes the incoming tics, or beats from the wheel speed sensor and the ticks from the output of the heart rate receiver. The 3DO multiplayer is a 32 device. The shift registers in the interface unit convert the data from the PIC Processor to 32 bit words for compatibility of communication with the 3DO player. The interface unit 32 basically collects data from the heart rate and wheel speed inputs and transmits the heart rate and wheel speed data to the 3D player when queried by the main program in the 3DO player. Provision may also be included in the interface unit 32 for providing a signal to a stepper motor or servomotor on the exercise device to vary the resistance provided by the resistance roller 42.

Figure 7A:
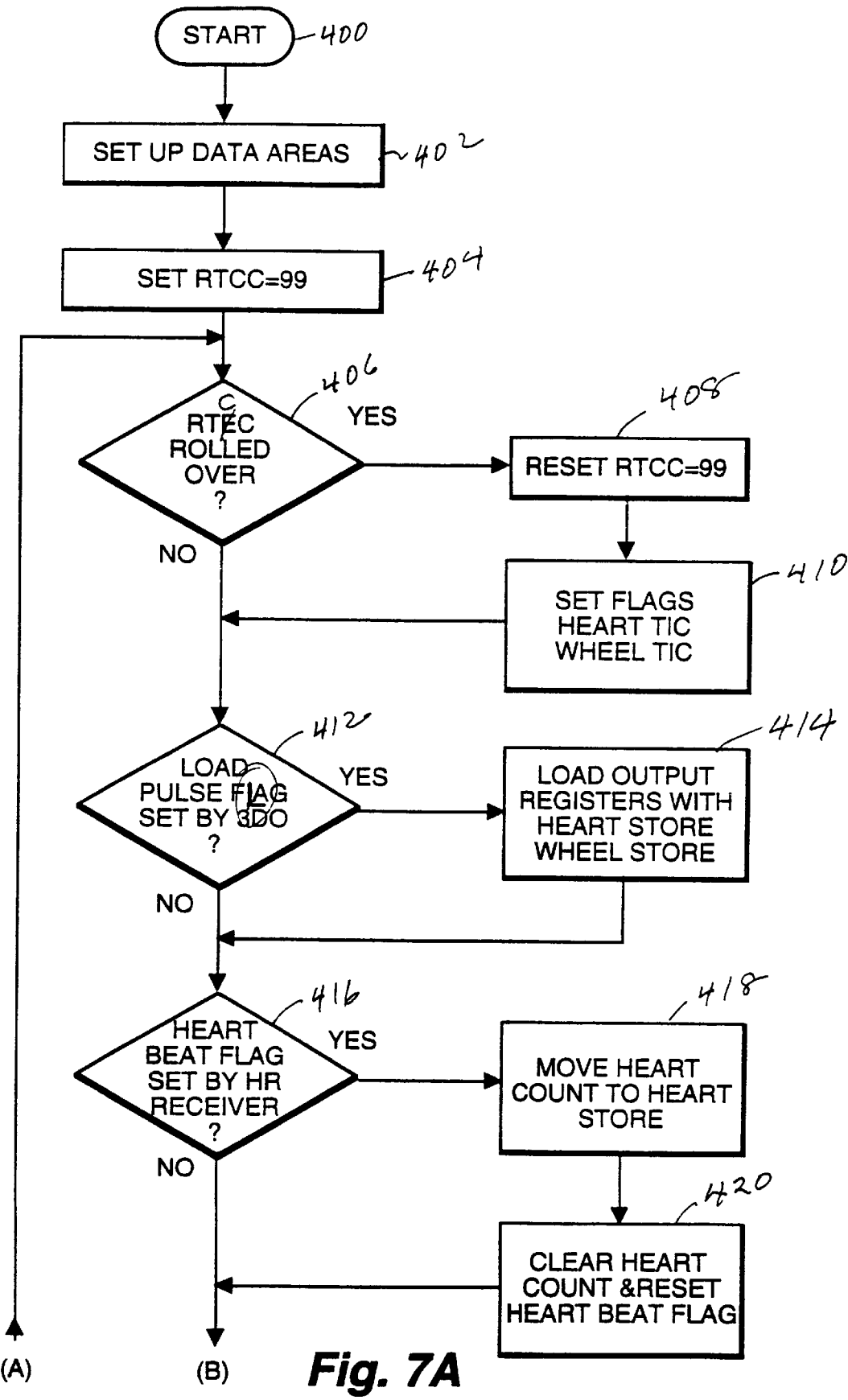
FIGS. 7A and 7B together is a logic flow diagram of the embedded processor in the Interface Unit of the present invention.
Figure 7B:
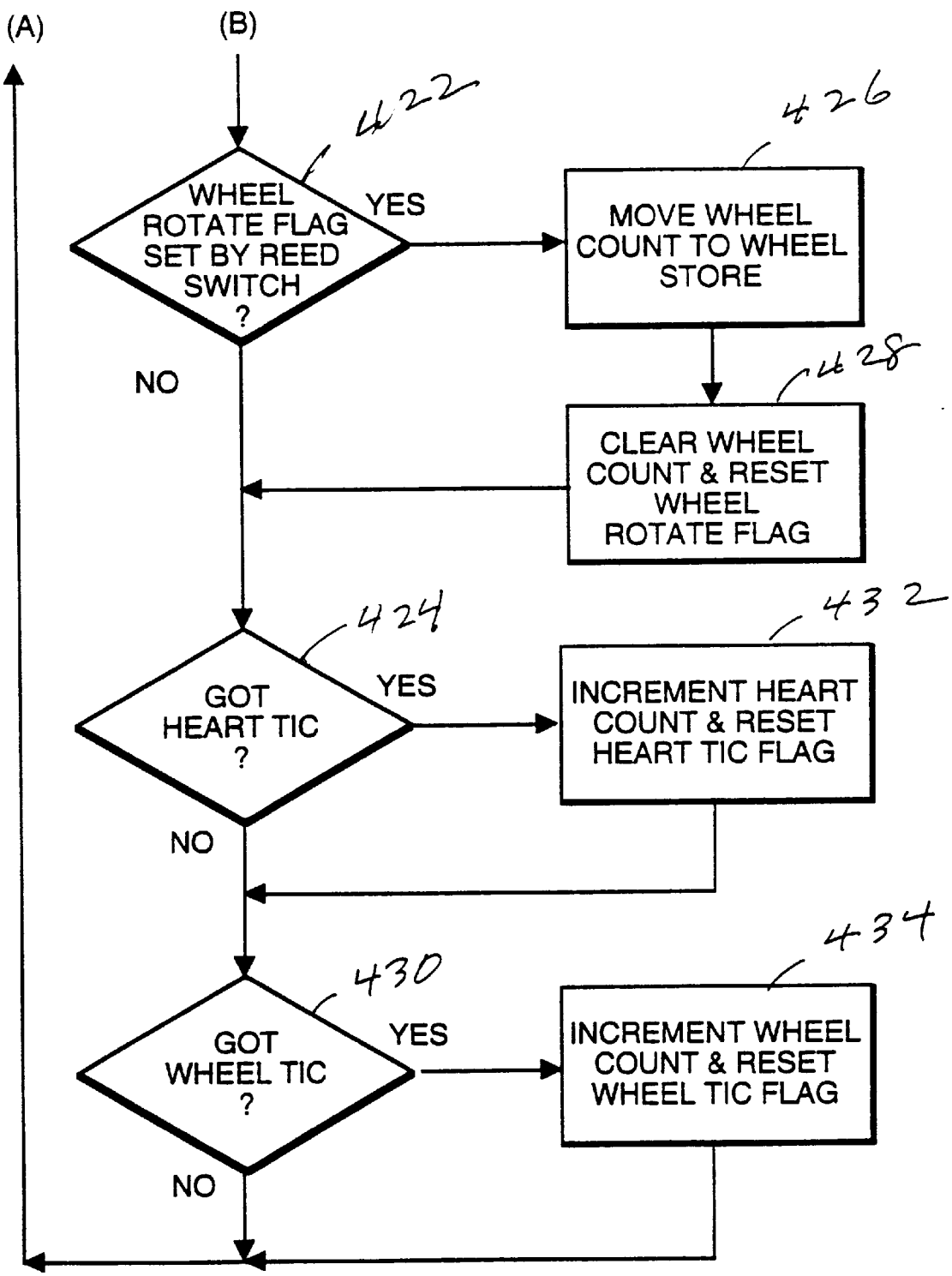

A logic flow diagram of the embedded program in the PIC processor is shown in FIG. 7. When the user turns on the 3DO player and inserts and plays a video CD, the interface unit processor starts in operation 400. A run time crystal clock RTCC is used to run the processor and to measure time durations between input pulses in the PIC processor. This RTCC runs at 10 MHz and counts between zero and 255. The output rolls over at 255. This equates to a rollover time of about a maximum of 2 milliseconds. Operation 402 initializes several flags and registers to zero. Specifically, a load pulse flag, a heart beat flag, a heart tic flag, a wheel rotation flag and a wheel tic flag are set to zero. Also, a heart count register, a heart store register, a wheel count register, and a wheel store register are set to zero. The heart count registers and wheel count registers are used to accumulate time tics between input pulses from the heart rate receiver and the wheel rotation reed switch as will become more apparent below.

Control then transfers to operation 404 where the run time crystal clock is set to 99. This clock then counts up to 255 and then rolls over to zero and continues counting to 255, rolling over, and repeating. This works out to about 2 milliseconds between rollovers. Control then shifts to operation 406 where the query is made whether the RTCC has rolled over. The actual query is whether the RTCC is less than 90. If yes, the RTCC is reset to 99 in operation 408 and the heart tic and wheel tic flags are set in operation 410. Control then proceeds to operation 412. If the RTCC has not yet rolled over, control passes directly to operation 412 without passing through operations 408 and 410. Operation 412 queries whether a load pulse flag has been set by the 3DO control program. This flag will be set if the 3DO program is ready to receive input from the interface unit 32. In this case, control transfers to operation 414 where the interface unit 32 output registers are loaded with the contents of the heart store and wheel store registers. These output registers are then immediately read by the 3DO operating system through the connection through the game controller or keypad 36.

Whether or not the load pulse flag is set by the 3DO player, control then passes to operation 416 where the query is made whether a heartbeat flag has been set, i.e. a beat has been received by the heart rate receiver. If a beat has been received, control passes to operation 418 where the heart count register contents are transferred to the heart store register. Then, in operation 420, the heart count register is reset to zero and the heart beat flag is reset in order to sense another heartbeat. Control then proceeds from operation 420 to operation 422. If no heartbeat has been received in the heart rate receiver, and thus the heart beat flag is not set, operation 416 transfers directly to operation 422.

In operation 422 the query is made whether the wheel rotate flag has been set by passage of the wheel magnet 24 past the reed switch 22. If not, control passes to operation 424. If the wheel rotate flag is set, control passes to operation 426 where the contents of the wheel count register are moved to the wheel store register. Control then transfers to operation 428, where the wheel count register is set to zero and the wheel rotate flag is reset in order to sense receipt of another wheel rotation.

Operation 424 queries whether the heart tic flag is set. If so, control transfers to operation 432 where the heart count register is incremented and the heart tic flag is reset. Control then transfers to operation 430. If the heart tic flag is not set, operation 424 transfers control directly to operation 430.

Operation 430 queries whether the wheel tic flag is set. If so, control transfers to operation 434 where the wheel count register is incremented and the wheel tic flag is reset. Control then passes back to operation 406. If the wheel tic flag is not set, operation 430 passes directly back to operation 406.

The sequence of operations described in FIG. 7 is continuous. The net effect of the sequence is to constantly update the heart count, wheel count, heart store, and wheel store registers as wheel rotations and heart beats are received. This information is passed into the output registers for transmission to the 3DO control system whenever the 3DO control program requests input which is about 60 times per second. It is to be understood that the above description is exemplary of one embodiment only.

Other programmed method variations and equivalents for providing the above exercise device and user input to the playing device will become readily apparent to those skilled in the art. In addition, other playing devices may be utilized in place of the 3DO system. For example, an MPEG-2 compatible player coupled to a personal computer may be used, or another CD player using a different operating system such as a Sony video game CD player. In these cases, the hardware in the interface unit may have to be modified to achieve bit compatibility with the particular player input devices. However, the basic logic flow of the example described above could still apply.

While the present invention has been described above with reference to a particular embodiment thereof, it is to be understood that many variations, alterations changes and additions may be made to the apparatus, system and method above described. It is therefore contemplated that all such modifications, alternatives and variations are within the scope of the present invention as defined by the following claims. All patents, provisional patent applications, and printed publications referred to herein are hereby incorporated by reference in their entirety.

What is claimed is:

1. A method of controlling a video frame sequence display rate of a prerecorded video playback sequence in a player device in response to an external signal, in which each video frame has a unique frame time stamp and a duration time stamp indicating the time between successive frames, said method comprising the steps of:

a) accessing said duration time stamp for a current video frame;

b) determining from said external signal an adjustment value for changing said display rate c) obtaining a modified duration time to a next frame by adding said adjustment value to said duration time stamp;

d) displaying said next frame when said modified duration time has passed; and e) repeating steps a through d for each subsequent video frame.

2. The method according to claim 1 wherein said accessing step comprises the steps of:

i) setting a time offset to current clock time;

ii) displaying a current video frame; and iii) accessing a frame time stamp and a duration time stamp for said current video frame.

3. The method according to claim 2 wherein said step of determining further comprises the step of comparing said external signal to predetermined criteria to determine said adjustment value.

4. The method according to claim 3 wherein said external signal is a user variable exercise rate signal.

5. The method according to claim 3 wherein said step of displaying further comprises the steps of:

i) adding said modified duration value to said time offset to obtain a next frame time; and ii) displaying said next frame when clock time exceeds said next frame time.

6. A method of controlling a video frame sequencing rate in a video playback sequence in which each video frame has a unique frame time stamp and a duration time stamp comprising the steps of:

a) setting time offset to current clock time;

b) displaying a current video frame;

c) accessing a frame time stamp value and a duration time stamp value associated with said current video frame;

d) accessing a user variable external signal;

e) determining an adjustment value from predetermined criteria compared to said external signal;

f) adding said adjustment value, said duration time stamp value, and said time offset to said frame time stamp value to generate a next frame time value;

g) displaying a next frame when current clock time exceeds said next frame time value; and h) repeating steps a) through g) for each successive video frame in said sequence of video frames.

7. The method according to claim 6 wherein said step of displaying comprises the steps of ia) comparing current clock time to said next frame time value;

ii) if said current clock time exceeds said next frame time value, then decompressing a next video frame into a display buffer; and iii) adding said adjustment factor to said time offset.

8. The method according to claim 7 wherein said external signal is an exercise rate signal.

9. The method according to claim 8 wherein said predetermined criteria includes a lookup table of adjustment values for different exercise rate signal values.

10. The method according to claim 6 further comprising the step of adding said adjustment value to said time offset when said next frame is displayed.

* * * * *